April 25, 1961   B. R. BETTER   2,981,544
FLOATING HOLDERS

Filed Oct. 16, 1958   2 Sheets-Sheet 1

INVENTOR
BERNARD R. BETTER
BY
Brown, Jackson, Boettcher & Dienner
ATTORNEYS

April 25, 1961     B. R. BETTER     2,981,544
FLOATING HOLDERS

Filed Oct. 16, 1958     2 Sheets-Sheet 2

INVENTOR
BERNARD R. BETTER
BY Brown, Jackson, Breitester & Deemer

ATTORNEYS

United States Patent Office 2,981,544
Patented Apr. 25, 1961

2,981,544

FLOATING HOLDERS

Bernard R. Better, Chicago, Ill., assignor to Scully-Jones and Company, Chicago, Ill., a corporation of Illinois Filed Oct. 16, 1958, Ser. No. 767,595

6 Claims. (Cl. 279—16)

This invention relates, in general, to floating holders of the type described and claimed in U.S. Patent No. 2,533,758, issued December 12, 1950, to Bernard Better and John W. Lehde, Jr., and in particular to a new floating holder constituting an improvement over the floating holders described and claimed in that patent.

As explained in the Better and Lehde patent, it is difficult, if not impractical, to make machine tools for performing operations such as drilling, reaming, tapping or the like with a spindle which is in exact alignment with the hole or part of the work piece which is to be operated upon. When there is lateral deflection of the axis of the spindle and the hole in the work piece, or when the machine spindle is slightly out of true center, the tool, for instance, a reamer, will make an irregularly shaped hole with consequent strain on the mechanism and possible imperfect work, causing unnecessary scrap. Floating holders of the type described in the Better and Lehde patent greatly improved the operation of machine tools in that it permitted the axis of the tool spindle to coincide with the axis of the hole in the work piece whereby the cutting tool operated more efficiently with friction reduced to a minimum and with little wear on the various parts.

As further set forth in the above identified patent, and in floating holders of the type therein contemplated, there were provided a thrust pin and a float bearing arrangement of the ball bearing type, the former being used to take up axial forces and the result of a cutting force acting upon a cutting tool, and the misalignment between the spindle of the machine tool and the hole being machined in the work piece.

It was found, however, that the ball bearing did not have sufficient thrust capacity in line with the thrust capacity of the other elements of the floating holder to support the dead weight of long boring bars horizontally mounted therein. Such reaction forces caused by the weight of the boring bar in a horizontal position, thus exceeding the capacities of the ball bearing thrust arrangement, caused indentations on the flat races and formed grooves therein which provided a resistance to the free rolling motion of the balls. This caused rapid wear and subsequent failure of the bearing, impairing the function of the floating holder greatly.

I have found that I can improve the operation of floating holders of the type described in that patent still further by the provision of a new and improved bearing arrangement in such holders and, thus, it is a general object of this invention to provide a new and improved floating holder having incorporated therein a new and improved bearing arrangement which combines the function of the thrust pin and floating bearings.

I accomplish this general object by the provision of a roller bearing arrangement which combines the thrust and float forces and which gives the arrangement a thrust capacity more in line with the capacity of the driving elements. These rollers are spaced apart between flat races and set in slotted roller cages which when assembled, are so positioned that lateral movement of the cutting tool in any direction, within limitation, is provided.

This arrangement increases the life and efficiency of the floating holder by providing a bearing that does not make a point contact with a flat race, will thus reduce wear on the races, and will support large thrust loads for longer periods of operation.

Accordingly, still another object of my invention is the provision of a new and improved roller bearing arrangement for floating holders which combines a means for suitably reacting against thrust and floating force.

Still another and more specific object of my invention is the provision of a new and improved roller type bearing arrangement allowing limited lateral movement in any direction, of parts in floating holders, thus increasing the efficiency and life of such holders.

Other and more particular objects of my invention will be apparent to those skilled in the art from the following description and drawings forming a part hereof and wherein.

Figure 1:
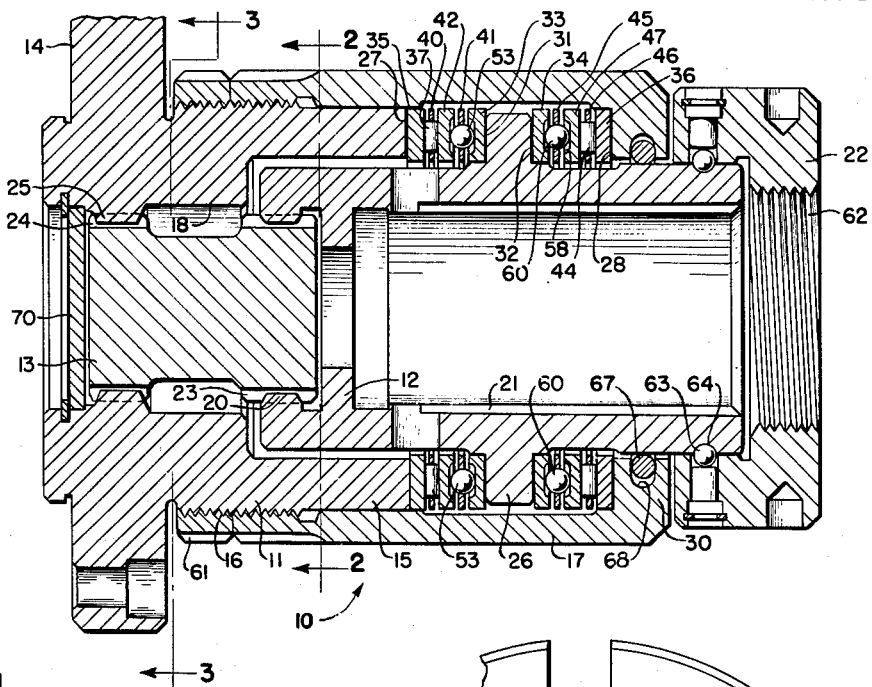
Figure 1 is a longitudinal sectional view of a floating holder constructed in accordance with the teachings of my invention.
Figure 2:
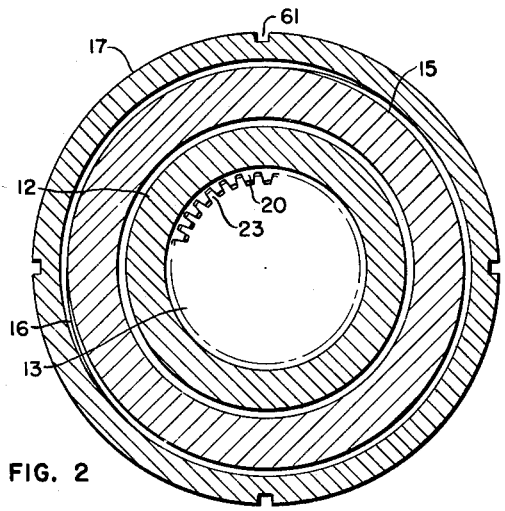
Figure 2 is a cross-sectional view of my holder shown in Figure 1 taken along line 2—2 of Figure 1 and looking in the direction of the arrows.
Figure 3:
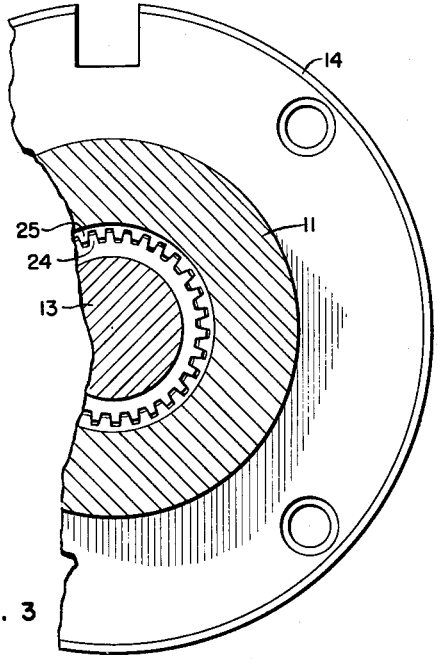
Figure 3 is a partial cross-sectional view of my holder shown in Figure 1, taken along line 3—3 of Figure 1, looking in the direction of the arrows, to illustrate to advantage the means for attaching my holder to a machine tool.

Turning now to the drawings, it can be seen that I have illustrated one embodiment of my invention, indicated in its entirety as 10, and comprising a driving member, illustrated in its entirety as 11, a driven member or tool holding means, indicated in its entirety as 12, rotatively driven through an intermediate floating type driving member or coupling, indicated in its entirety as 13.

Driving member 11 has a radially extending apertured flange 14 for engagement with the spindle of a machine tool (not shown) in the conventional manner, an axially extending hollow cylindrical or cup-shaped extension 15, externally threaded as at 16 for receiving a hollow cap 17, and is counterbored as at 18 to receive the floating coupling 13.

Driven member or tool holding means 12 is provided at one end with internal splines 20, is internally bored as at 21 and adapted to hold any tool to be used with the floating holder. Tool holding means 12 extends substantially the full length of the cap 17 and outwardly therebeyond and is provided with a tool holding collar 22 (to be described) to cooperate with the boring tool.

Rotatable intermediate member or coupling 13 is mounted coaxially with the driving member 11 and the collet 12 and is provided at its right end (as shown in the drawings) with external splines 23 which cooperate with the internal splines 20 on the tool holding means 12 and is received partially within the tool holding means to be in driving relationship therewith as can be appreciated.

The left end of the coupling 13 is provided with external splines 24 which cooperate with internal splines 25 on the driving member 11 whereby rotative forces acting upon the driving member 11 are transferred through the spline teeth 25, 24, 23, 20 to the tool holding means 12. Spline teeth 25, 24, 23, 20 are preferably ground spherically to permit limited rocking movement between the drive 11 and the tool holding means 12. Also, the relationship between the outer diameter of the coupling 13, the internal diameter of the driving member 11 and the external diameter of the tool holding means 12 is such that limited rocking movement is permitted between the driving member 11 and the tool holding means 12 is shown schematically in Figure 4 and to be described more fully.

Since, as previously explained, deviation of the tool holding means from true center to accommodate misalignment between spindles and work pieces is a necessary function of my floating holder, a suitable bearing arrangement must be provided. As previously explained also, this bearing arrangement preferably properly reacts against the axial forces between the spindle and the work piece as the cutting tool is in operation, but also adequately resists the weight acting upon the bearings while the boring bar is in horizontal position. Prior bearing arrangements in floating holders of this type have been found to be deficient and the improvement thereover constitutes one of the major features of my present invention.

Figure 6:
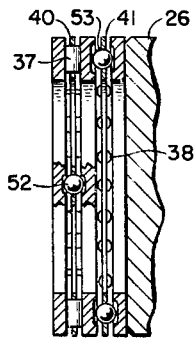
Figure 6 is a small semi-schematic view in section of the bearing means illustrated in Figure 5 assembled in operative relationship.

In the present embodiment, tool holding means 12 is provided with an integrally formed annular flange 26 substantially centrally between the end 27 of the cylindrical extension 15 on the driving member 11 and the radial surface 28 of inwardly turned flange 30 on the cap 17. Each of the radial surfaces 31, 32 of the flange 26 provides a backing supporting surface for a circular race member 33, 34. Similarly, end 27 provides a supporting surface for a circular race member 35 and supporting surface 28 provides the supporting surface for race member 36. Pairs of race members 33, 35 have interposed therebetween a pair of sets of roller bearings 37, 38 (38 being shown in end elevation in Fig. 6), disposed respectively in cages 40, 41 with still another race member 42 therebetween. Similarly pairs of race members 34, 36 have interposed therebetween a pair of sets of roller bearings 43, 44 (one set 44 only being shown in Fig. 1) disposed respectively in cages 45, 46 with still another race member 47 therebetween.

Thus the bearing arrangement comprising races 33, 35 and 42 together with sets of roller bearings 37, 38 and cages 40 and 41 permits movement of the tool holding means 12 perpendicularly of the holder axis both in the plane of Fig. 1 and in a plane normal thereto. This same is true of the bearing arrangement which comprises the races 34, 36 and 47, sets of roller bearings 43 and 44 and cages 45, 46 with still another race member 47 thereother bearing arrangement 33—42 permits similar movement of the collet.

Figure 5:
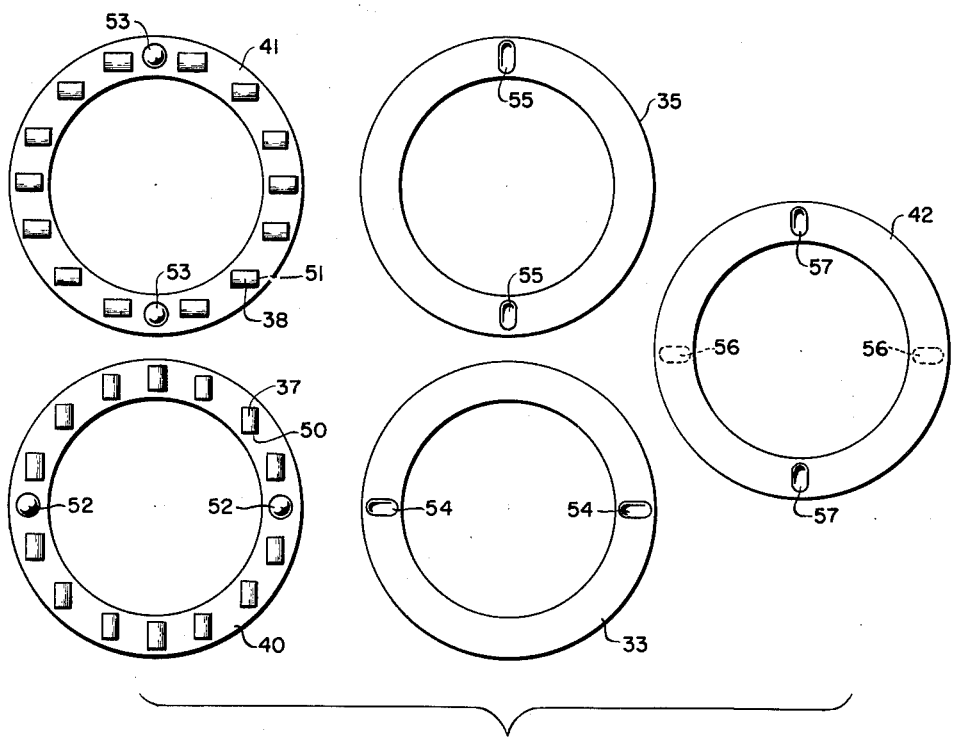
Figure 5 is an illustration of part of my new and improved bearing means for my floating holder illustrated in Figure 1 but disassembled to illustrate the relationship of the roller bearings and the races.

Turning now to Figure 5 where there is shown a portion of one of the bearing arrangements, illustrated in Figure 5 in unassembled relationship to explain in detail the structural relationship between the parts, it can be seen that each cage 40 and 41 for the sets of roller bearings 37 and 38 is provided, respectively, with parallel rectangular apertures 50 and 51 arranged so that the axes of rotation of the roller bearings are parallel to each other in the respective cage. To insure that the cages 40 and 41 and the rollers remain in their respective horizontal and vertical positions, means are provided on each of the cages and the races to accomplish this function. In the embodiment illustrated, each race 40, 41 is provided with a pair of ball bearings 52, 53 located on the diameter of the respective cages. Each ball bearing has a diameter greater than the thickness of the respective race and greater than the roller bearings (as can be seen in Figure 1 where ball bearings 53 are illustrated) whereby the outer periphery thereof seats in an elongated diametrically arranged groove in each of the respective races. Pairs of grooves 54, 55 are in races 33 and 35, respectively, and their cooperating grooves 56 and 57 are disposed respectively on opposite sides of the middle race 42. Thus, as more clearly shown in Fig. 1 and in Fig. 6, sets of rollers 37, 38 each coact against their respective races, pairs of ball bearings 52 operate within the limitations provided by pairs of horizontal grooves 54, 56 and pairs of ball bearings 53 operate within the limitations provided by vertical grooves 55, 57 to accommodate movement of the flange 26.

Similarly, with the cages 45, 46 sandwiched between races 34, 36 and 47 and the entire arrangement being provided with suitable ball bearings in horizontal and vertical grooves (vertical grooves 58 and bearings 60 only being shown), 360° lateral movement for flange 26 is accommodated and the flange 26 will be permitted to move upwardly or downwardly, inwardly or outwardly with respect to the plane of the drawing (see Fig. 4) with the limitation being provided by the length of the respective grooves in the races.

From the above description it can be seen that upon assembly of the tool holding means 12 in the cap 17, the longitudinal movement of the tool holding means 12 is controlled by the position of the cap 17 as threadably engaged on the external threads 16, and the tightening of the end of the cap 17 against a locking ring 61, also threadably received on threads 16, regulates the relative tightness of the bearing arrangement.

In the embodiment illustrated, I have provided collar 22, internally threaded as at 62 and provided at one end with bearings 63, which rotate in a peripheral channel 64 in the adjacent end of the tool holding means 12. This particular collar arrangement is particularly adaptable to chuck one particular type of boring bar and is illustrated as a typical means of holding a boring bar in my tool holding means. Since this particular collar arrangement forms no part of the present invention and is merely illustrative of tool chucks operable of my device, no further description is necessary thereon. Obviously, too, the tool holding means could be provided with a conventional transverse knock-out opening, if desired.

Figure 4:
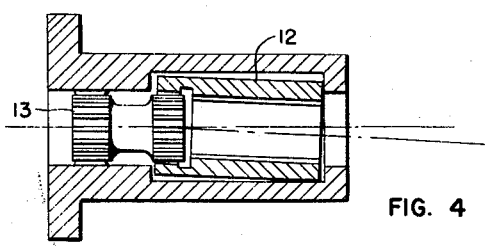
Figure 4 is a diagrammatic sectional view illustrating the operation of my holder.
Figure 7:
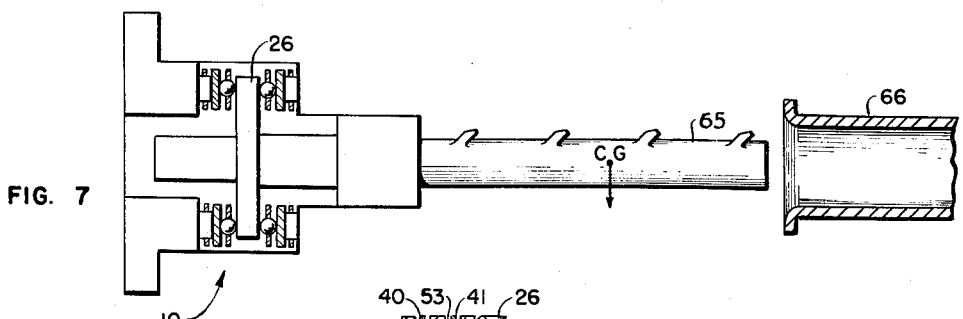
Figure 7 is a schematic view of my floating holder illustrating to advantage the relationship between the bearing means, the boring tool and the work piece.

The operation of my floating holder may be readily seen from Figures 4 and 7. The axis of the driving member 11 is shown in Figure 4 offset or out of alignment with the axis of the tool holding means 12 which carries the tool 65 (Fig. 7). Assuming that the tool 65 is in engagement with the hole in the work piece 66, it will be properly driven with its axis out of alignment with the driving member, the drive being accomplished by the coupling 13, the curved or spherical surfaces of the spline teeth 24, 25, 23 and 20 serving to permit universal movement whereby the driving connection acts in the nature of a universal joint between the driving member and the driven tool. It will, of course, be understood that there will be sufficient play between the splines to permit such universal movement.

The thrust due to the pressure of the tool working on the work piece will be taken up directly by the bearing arrangement thus permitting any necessary rocking or lateral movement of the tool holding means. By means of this arrangement, it will be seen that the pressure necessary to hold the tool or force the same into the work piece will be asserted through the bearing arrangement and will not be carried by the driving mechanism or the universal joint which will therefore act freely without unnecessary binding or friction and a packing ring 67 is provided in a groove 68 on the inner end of the flange 30 of the cap 17. Ring 67 fits closely against the periphery of the tool holding means 12, the groove 68 being sufficiently deep to permit lateral movement of the tool holding means. The outer periphery of the tool holding means and the sealing ring, together with a suitable sealing arrangement at the other end of the tool and indicated in its entirety as 70, serve effectively to prevent dirt, chips or the like, from entering the holder which might otherwise tend to interfere with the successful operation of my device.

As previously mentioned, the roller bearing arrangement combines the function of thrust and floating bearings and is sufficiently able to resist the reaction forces caused by the boring bar in the horizontal position, whether or not the boring bar is actually under operation. As can be seen in Figure 7 the heavy boring bar 65 tends to pull the radial flange 26 about its pivot point so that the upper portion tends to move to the right and the lower portion tends to move towards the left. The roller bearings as arranged according to the teachings of my invention, are able to withstand such a reaction force more in line with the thrust capacities of the rest of the floating holder. This eliminates the indentations in the flat races whereby there is no resistance to free rolling motion of the rollers.

Where herein the various parts of my invention have been referred to as located in a right or left or an upper or lower or an inward or outward position, it will be understood that this is done solely for the purpose of facilitating description and that such references relate only to the relative positions of the parts as shown in the drawings.

Also, it is to be understood that many changes and modifications may be made without departing from the scope or spirit of the invention and the invention is defined and comprehended solely by the appended claims which should be construed as broadly as the prior art will permit.

I claim:

1. A floating holder comprising a driving member adapted for use in a machine tool, a tool-holding driven member mounted in the driving member, means providing oppositely directed flat bearing surfaces between said driving and driven members, universal joint means between said members for driving the driven member, roller bearing means between the members engaging said flat surfaces and arranged to permit relative movement of the members in any direction normal to the driving axis, and means limiting said relative movement of the members.

2. A floating holder substantially as defined in claim 1, in which said roller bearing means comprise roller bearings arranged in a plurality of sets in parallel planes with the axes of rotation of each set perpendicular to the axes of rotation of an adjacent set, and means to prevent relative rotation of said sets about the driving axis.

3. A floating holder comprising a driving member adapted for use in a machine tool, a tool-holding driven member carried by said driving member, universal joint means between said driving and driven members, and roller bearing means between said members arranged to permit relative movement of the members in any direction normal to the driving axis, said roller bearing means including a pair of cages, a set of roller bearings in parallel relation to each other in one of said cages, another set of roller bearings in parallel relation to each other in the other cage, the roller bearing sets being disposed in parallel planes with the axes of one set at an angle relative to the axes of the other set, flat-surfaced bearing means between the cages engaged on opposite faces by said sets of roller bearings, and means locating and holding the cages in relative position to dispose the respective roller bearing axes at said angle and permitting limited rolling of the bearings on said flat-surfaced bearing means surfaces to effect said relative movement of the members.

4. A floating holder substantially as defined in claim 3, in which said locating means comprises a ball in each of the cages and a pair of radially extending grooves in the opposite faces of the flat-surfaced bearing means each receiving one of said balls therein.

5. A floating tool holder comprising a cylindrical member, a tool-holding member carried in said cylindrical member, splined coupling means providing a driving connection between said members allowing limited lateral movement therebetween, and means holding the tool-holding member against longitudinal movement in the cylindrical member but permitting limited lateral movement thereof and taking the thrust loads of the floating holder in operation thereof, said holding means including roller bearing means between said members having a flat bearing member between and engaging a pair of sets of roller bearings in which the roller bearings of each set are arranged with their axes parallel to each other and at an angle to the bearing axes of the other set.

6. A floating tool holder as defined in claim 5, in which said roller bearing means includes means for retaining said roller bearing sets with the respective bearing axes at said angle.

References Cited in the file of this patent

UNITED STATES PATENTS

| | | |
|---|---|---|
| 1,398,679 | Clark | Nov. 29, 1921 |
| 2,533,758 | Better | Dec. 12, 1950 |
| 2,555,419 | Reaves | June 5, 1951 |
| 2,826,053 | Munn | Mar. 11, 1958 |

FOREIGN PATENTS

| | | |
|---|---|---|
| 792,291 | Great Britain | Mar. 26, 1958 |